US012533461B2

(12) United States Patent
Kamrava et al.

(10) Patent No.: US 12,533,461 B2
(45) Date of Patent: Jan. 27, 2026

(54) PUMP MECHANISM WITH DOUBLE RESERVOIR AND STATIONARY FLUID PORTS

(71) Applicant: INSULET CORPORATION, Acton, MA (US)

(72) Inventors: Soroush Kamrava, Everett, MA (US); Kyle Breingan, Lowell, MA (US); Maureen McCaffrey, Arlington, MA (US); Jeffrey Barnes, Medford, MA (US)

(73) Assignee: INSULET CORPORATION, Acton, MA (US)

( * ) Notice: Subject to any disclaimer, the term of this patent is extended or adjusted under 35 U.S.C. 154(b) by 12 days.

(21) Appl. No.: 18/160,429

(22) Filed: Jan. 27, 2023

(65) Prior Publication Data

US 2024/0042126 A1 Feb. 8, 2024

Related U.S. Application Data

(60) Provisional application No. 63/370,393, filed on Aug. 4, 2022.

(51) Int. Cl.
*A61M 5/142* (2006.01)
*F04B 13/00* (2006.01)
(Continued)

(52) U.S. Cl.
CPC ........... *A61M 5/142* (2013.01); *F04B 19/022* (2013.01); *A61M 2005/14252* (2013.01);
(Continued)

(58) Field of Classification Search
CPC ......... A61M 5/142; A61M 2005/14252; F04B 13/00; F04B 19/22; F04B 39/0005;
(Continued)

(56) References Cited

U.S. PATENT DOCUMENTS 2,667,986 A    2/1954  Perelson
2,911,008 A   11/1959  Du Bois
(Continued)

FOREIGN PATENT DOCUMENTS

CN    107096091 A    8/2017
DE       420595 C   10/1925
(Continued)

OTHER PUBLICATIONS

US 5,954,699 A, 09/1999, Jost et al. (withdrawn)
(Continued)

*Primary Examiner* — David N Brandt
(74) *Attorney, Agent, or Firm* — GOODWIN PROCTER LLP

(57) ABSTRACT

Disclosed herein is a double reservoir configuration for a pumping mechanism for a drug delivery device wherein one reservoir is rigidly fixed to a housing of the device and the other reservoir moves linearly translates with respect to the fixed reservoir. To avoid having either the input fluid port or the output fluid port moves as the second reservoir linearly translates, one port is in fluid communication with the fixed reservoir and a second fluid port is in communication with the moving reservoir via a hollow tube supporting a static plunger disposed within the moving reservoir. This arrangement provides for the added benefit of allowing air trapped within either of the reservoirs to be almost completely removed as the pump mechanism is filled with the fluid.

9 Claims, 6 Drawing Sheets

(51) Int. Cl.
*F04B 19/02* (2006.01)
*F04B 19/22* (2006.01)
*F04B 39/00* (2006.01)
*F04B 39/12* (2006.01)
*F04B 53/00* (2006.01)
*F04B 53/14* (2006.01)

(52) U.S. Cl.
CPC ............... *F04B 13/00* (2013.01); *F04B 19/22* (2013.01); *F04B 39/0016* (2013.01); *F04B 39/121* (2013.01); *F04B 39/123* (2013.01); *F04B 39/125* (2013.01); *F04B 53/007* (2013.01); *F04B 53/143* (2013.01); *F04B 53/144* (2013.01)

(58) Field of Classification Search
CPC .. F04B 39/0016; F04B 39/121; F04B 39/123; F04B 39/125; F04B 53/007; F04B 53/143; F04B 53/144; F04B 19/022
See application file for complete search history.

(56) References Cited

U.S. PATENT DOCUMENTS

| | | |
|---|---|---|
| 3,631,847 A | 1/1972 | Hobbs |
| 3,792,703 A | 2/1974 | Moorehead |
| 3,812,843 A | 5/1974 | Wootten et al. |
| 3,841,328 A | 10/1974 | Jensen |
| 3,885,662 A | 5/1975 | Schaefer |
| 4,067,000 A | 1/1978 | Carlson |
| 4,108,177 A | 8/1978 | Pistor |
| 4,151,845 A | 5/1979 | Clemens |
| 4,152,098 A | 5/1979 | Moody et al. |
| 4,193,397 A | 3/1980 | Tucker et al. |
| 4,211,998 A | 7/1980 | Junginger et al. |
| 4,231,019 A | 10/1980 | Junginger et al. |
| 4,237,878 A | 12/1980 | Kobayashi et al. |
| 4,261,388 A | 4/1981 | Shelton |
| 4,276,170 A | 6/1981 | Vaillancourt |
| 4,342,311 A | 8/1982 | Whitney et al. |
| 4,364,385 A | 12/1982 | Lossef |
| 4,373,527 A | 2/1983 | Fischell |
| 4,424,720 A | 1/1984 | Bucchianeri |
| 4,435,173 A | 3/1984 | Siposs et al. |
| 4,469,481 A | 9/1984 | Kobayashi |
| 4,475,901 A | 10/1984 | Kraegen et al. |
| 4,498,843 A | 2/1985 | Schneider et al. |
| 4,507,115 A | 3/1985 | Kambara et al. |
| 4,514,732 A | 4/1985 | Hayes, Jr. |
| 4,529,401 A | 7/1985 | Leslie et al. |
| 4,551,134 A | 11/1985 | Slavik et al. |
| 4,559,033 A | 12/1985 | Stephen et al. |
| 4,559,037 A | 12/1985 | Franetzki et al. |
| 4,560,979 A | 12/1985 | Rosskopf |
| 4,562,751 A | 1/1986 | Nason et al. |
| 4,585,439 A | 4/1986 | Michel |
| 4,601,707 A | 7/1986 | Albisser et al. |
| 4,624,661 A | 11/1986 | Arimond |
| 4,634,427 A | 1/1987 | Hannula et al. |
| 4,678,408 A | 7/1987 | Nason et al. |
| 4,684,368 A | 8/1987 | Kenyon |
| 4,685,903 A | 8/1987 | Cable et al. |
| 4,734,092 A | 3/1988 | Millerd |
| 4,743,243 A | 5/1988 | Vaillancourt |
| 4,755,173 A | 7/1988 | Konopka et al. |
| 4,781,688 A | 11/1988 | Thoma et al. |
| 4,781,693 A | 11/1988 | Martinez et al. |
| 4,801,957 A | 1/1989 | Vandemoere |
| 4,808,161 A | 2/1989 | Kamen |
| 4,836,752 A | 6/1989 | Burkett |
| 4,855,746 A | 8/1989 | Stacy |
| 4,858,619 A | 8/1989 | Toth |
| 4,871,351 A | 10/1989 | Feingold |
| 4,882,600 A | 11/1989 | Van de Moere |
| 4,886,499 A | 12/1989 | Cirelli et al. |
| 4,898,578 A | 2/1990 | Rubalcaba, Jr. |
| 4,898,579 A | 2/1990 | Groshong et al. |
| 4,944,659 A | 7/1990 | Labbe et al. |
| 4,969,874 A | 11/1990 | Michel et al. |
| 4,973,998 A | 11/1990 | Gates |
| 4,985,016 A | 1/1991 | Theeuwes et al. |
| 4,991,743 A | 2/1991 | Walker |
| 4,994,047 A | 2/1991 | Walker et al. |
| 5,007,458 A | 4/1991 | Marcus et al. |
| 5,045,871 A | 9/1991 | Reinholdson |
| 5,062,841 A | 11/1991 | Siegel |
| 5,109,850 A | 5/1992 | Blanco et al. |
| 5,125,415 A | 6/1992 | Bell |
| 5,135,485 A | 8/1992 | Cohen et al. |
| 5,176,662 A | 1/1993 | Bartholomew et al. |
| 5,178,609 A | 1/1993 | Ishikawa |
| 5,189,609 A | 2/1993 | Tivig et al. |
| 5,205,819 A | 4/1993 | Ross et al. |
| 5,213,483 A | 5/1993 | Flaherty et al. |
| 5,232,439 A | 8/1993 | Campbell et al. |
| 5,236,418 A | 8/1993 | Kriesel |
| 5,239,326 A | 8/1993 | Takai |
| 5,244,463 A | 9/1993 | Cordner, Jr. et al. |
| 5,245,447 A | 9/1993 | Stemmle |
| 5,254,096 A | 10/1993 | Rondelet et al. |
| 5,257,980 A | 11/1993 | Van Antwerp et al. |
| 5,261,884 A | 11/1993 | Stern et al. |
| 5,281,202 A | 1/1994 | Weber et al. |
| 5,308,335 A | 5/1994 | Ross et al. |
| 5,312,337 A | 5/1994 | Flaherty et al. |
| 5,318,540 A | 6/1994 | Athayde et al. |
| 5,342,313 A | 8/1994 | Campbell et al. |
| 5,346,476 A | 9/1994 | Elson |
| 5,364,342 A | 11/1994 | Beuchat et al. |
| 5,368,570 A | 11/1994 | Thompson et al. |
| 5,411,480 A | 5/1995 | Kriesel |
| 5,433,710 A | 7/1995 | VanAntwerp et al. |
| 5,452,033 A | 9/1995 | Balling et al. |
| 5,492,534 A | 2/1996 | Athayde et al. |
| 5,503,628 A | 4/1996 | Fetters et al. |
| 5,505,709 A | 4/1996 | Funderburk et al. |
| 5,507,288 A | 4/1996 | Bocker et al. |
| 5,514,096 A | 5/1996 | Hiejima |
| 5,533,389 A | 7/1996 | Kamen et al. |
| 5,545,152 A | 8/1996 | Funderburk et al. |
| 5,569,191 A | 10/1996 | Meyer |
| 5,573,342 A | 11/1996 | Patalano |
| 5,575,770 A | 11/1996 | Melsky et al. |
| 5,576,781 A | 11/1996 | Deleeuw |
| 5,582,593 A | 12/1996 | Hultman |
| 5,584,813 A | 12/1996 | Livingston et al. |
| 5,613,956 A | 3/1997 | Patterson et al. |
| 5,630,710 A | 5/1997 | Tune et al. |
| 5,637,095 A | 6/1997 | Nason et al. |
| 5,643,213 A | 7/1997 | McPhee |
| 5,647,853 A | 7/1997 | Feldmann et al. |
| 5,665,065 A | 9/1997 | Colman et al. |
| 5,665,070 A | 9/1997 | McPhee |
| 5,676,529 A * | 10/1997 | Hermansen ........... F04B 33/005 417/259 |
| 5,678,539 A | 10/1997 | Schubert et al. |
| 5,685,859 A | 11/1997 | Kornerup |
| 5,693,018 A | 12/1997 | Kriesel et al. |
| 5,695,490 A | 12/1997 | Flaherty et al. |
| 5,702,363 A | 12/1997 | Flaherty |
| 5,704,520 A | 1/1998 | Gross |
| 5,716,343 A | 2/1998 | Kriesel et al. |
| 5,726,404 A | 3/1998 | Brody |
| 5,726,751 A | 3/1998 | Altendorf et al. |
| 5,741,228 A | 4/1998 | Lambrecht et al. |
| 5,747,350 A | 5/1998 | Sattler |
| 5,748,827 A | 5/1998 | Holl et al. |
| 5,755,682 A | 5/1998 | Knudson et al. |
| 5,764,159 A | 6/1998 | Neftel |
| 5,776,103 A | 7/1998 | Kriesel et al. |
| 5,779,676 A | 7/1998 | Kriesel et al. |
| 5,785,681 A | 7/1998 | Indravudh |
| 5,785,688 A | 7/1998 | Joshi et al. |
| 5,797,881 A | 8/1998 | Gadot |

(56) References Cited

U.S. PATENT DOCUMENTS

| | | |
|---|---|---|
| 5,800,397 A | 9/1998 | Wilson et al. |
| 5,800,405 A | 9/1998 | McPhee |
| 5,800,420 A | 9/1998 | Gross et al. |
| 5,810,015 A | 9/1998 | Flaherty |
| 5,814,020 A | 9/1998 | Gross |
| 5,840,063 A | 11/1998 | Flaherty |
| 5,845,218 A | 12/1998 | Altschul |
| 5,848,990 A | 12/1998 | Cirelli et al. |
| 5,848,991 A | 12/1998 | Gross et al. |
| 5,851,197 A | 12/1998 | Marano et al. |
| 5,858,005 A | 1/1999 | Kriesel |
| 5,858,239 A | 1/1999 | Kenley et al. |
| D405,524 S | 2/1999 | Falk |
| 5,865,806 A | 2/1999 | Howell |
| 5,871,470 A | 2/1999 | McWha |
| 5,875,393 A | 2/1999 | Altschul et al. |
| 5,876,377 A | 3/1999 | Kriesel |
| 5,885,659 A | 3/1999 | Takahashi et al. |
| 5,885,808 A | 3/1999 | Spooner et al. |
| 5,886,647 A | 3/1999 | Badger et al. |
| 5,891,097 A | 4/1999 | Saito et al. |
| 5,897,530 A | 4/1999 | Jackson |
| 5,906,592 A | 5/1999 | Kriesel et al. |
| 5,906,597 A | 5/1999 | McPhee |
| 5,911,716 A | 6/1999 | Rake et al. |
| 5,919,167 A | 7/1999 | Mulhauser et al. |
| 5,921,419 A | 7/1999 | Niedospial, Jr. et al. |
| 5,931,814 A | 8/1999 | Alex et al. |
| 5,935,099 A | 8/1999 | Peterson et al. |
| 5,954,058 A | 9/1999 | Flaherty |
| 5,954,694 A | 9/1999 | Sunseri |
| 5,957,890 A | 9/1999 | Mann et al. |
| 5,957,895 A | 9/1999 | Sage et al. |
| 5,961,492 A | 10/1999 | Kriesel et al. |
| 5,965,848 A | 10/1999 | Altschul et al. |
| 5,983,094 A | 11/1999 | Altschul et al. |
| 5,993,423 A | 11/1999 | Choi |
| 5,997,501 A | 12/1999 | Gross et al. |
| 6,019,747 A | 2/2000 | McPhee |
| 6,024,539 A | 2/2000 | Blomquist |
| 6,045,533 A | 4/2000 | Kriesel et al. |
| 6,050,978 A | 4/2000 | Orr et al. |
| 6,071,292 A | 6/2000 | Makower et al. |
| 6,090,080 A | 7/2000 | Jost et al. |
| 6,090,092 A | 7/2000 | Fowles et al. |
| 6,126,637 A | 10/2000 | Kriesel et al. |
| 6,144,847 A | 11/2000 | Altschul et al. |
| 6,152,898 A | 11/2000 | Olsen |
| 6,174,300 B1 | 1/2001 | Kriesel et al. |
| 6,190,359 B1 | 2/2001 | Heruth |
| 6,200,338 B1 | 3/2001 | Solomon et al. |
| 6,206,850 B1 | 3/2001 | ONeil |
| 6,210,368 B1 | 4/2001 | Rogers |
| 6,244,778 B1 | 6/2001 | Chesbrough |
| 6,309,370 B1 | 10/2001 | Haim et al. |
| 6,363,609 B1 | 4/2002 | Pickren |
| 6,375,638 B2 | 4/2002 | Nason et al. |
| 6,375,639 B1 | 4/2002 | Duplessie et al. |
| 6,475,196 B1 | 11/2002 | Vachon |
| 6,520,936 B1 | 2/2003 | Mann |
| 6,527,744 B1 | 3/2003 | Kriesel et al. |
| 6,569,125 B2 | 5/2003 | Jepson et al. |
| 6,572,542 B1 | 6/2003 | Houben et al. |
| 6,572,585 B2 | 6/2003 | Choi |
| 6,666,852 B2 | 12/2003 | Niedospial, Jr. |
| 6,699,221 B2 | 3/2004 | Vaillancourt |
| 6,740,059 B2 | 5/2004 | Flaherty |
| 6,883,778 B1 | 4/2005 | Newton et al. |
| 7,008,404 B2 | 3/2006 | Nakajima |
| 7,018,360 B2 | 3/2006 | Flaherty et al. |
| 7,025,744 B2 | 4/2006 | Utterberg et al. |
| 7,060,059 B2 | 6/2006 | Keith et al. |
| 7,128,727 B2 | 10/2006 | Flaherty et al. |
| 7,137,964 B2 | 11/2006 | Flaherty |
| 7,144,384 B2 | 12/2006 | Gorman et al. |
| 7,160,272 B1 | 1/2007 | Eyal et al. |
| 7,220,245 B2 | 5/2007 | Kriesel |
| 7,267,665 B2 | 9/2007 | Steil et al. |
| 7,291,133 B1 | 11/2007 | Kindler et al. |
| 7,303,549 B2 | 12/2007 | Flaherty |
| 7,918,825 B2 | 4/2011 | OConnor et al. |
| 8,277,415 B2 | 10/2012 | Mounce et al. |
| 8,613,724 B2 | 12/2013 | Lanier, Jr. et al. |
| 8,734,396 B2 | 5/2014 | Wyss |
| 8,758,308 B2 | 6/2014 | Alferness et al. |
| 9,402,950 B2 | 8/2016 | Dilanni et al. |
| 2001/0034502 A1 | 10/2001 | Moberg et al. |
| 2001/0053895 A1 | 12/2001 | Vaillancourt |
| 2002/0010423 A1 | 1/2002 | Gross et al. |
| 2002/0032374 A1 | 3/2002 | Holker et al. |
| 2002/0066715 A1 | 6/2002 | Niedospial |
| 2002/0123740 A1 | 9/2002 | Flaherty et al. |
| 2003/0120262 A1 | 6/2003 | Weiland et al. |
| 2003/0136189 A1 | 7/2003 | Lauman et al. |
| 2003/0139774 A1 | 7/2003 | Epstein et al. |
| 2003/0163097 A1 | 8/2003 | Fleury et al. |
| 2003/0198558 A1 | 10/2003 | Nason et al. |
| 2004/0010207 A1 | 1/2004 | Flaherty et al. |
| 2004/0064088 A1 | 4/2004 | Gorman et al. |
| 2004/0088224 A1 | 5/2004 | Mukai |
| 2004/0092865 A1 | 5/2004 | Flaherty et al. |
| 2004/0115068 A1 | 6/2004 | Hansen et al. |
| 2004/0116847 A1 | 6/2004 | Wall |
| 2004/0158208 A1 | 8/2004 | Hiejima |
| 2004/0203357 A1 | 10/2004 | Nassimi |
| 2005/0020980 A1 | 1/2005 | Inoue et al. |
| 2005/0187524 A1 | 8/2005 | Willis et al. |
| 2005/0203461 A1 | 9/2005 | Flaherty et al. |
| 2005/0238507 A1 | 10/2005 | Dilanni et al. |
| 2005/0258581 A1 | 11/2005 | Tanaka |
| 2006/0134323 A1 | 6/2006 | OBrien |
| 2006/0155210 A1 | 7/2006 | Beckman et al. |
| 2006/0178633 A1 | 8/2006 | Garibotto et al. |
| 2006/0204535 A1 | 9/2006 | Johnson |
| 2006/0253085 A1 | 11/2006 | Geismar et al. |
| 2006/0253088 A1 | 11/2006 | Chow et al. |
| 2006/0282290 A1 | 12/2006 | Flaherty et al. |
| 2007/0005018 A1 | 1/2007 | Tekbuchava |
| 2007/0025811 A1 | 2/2007 | Wilhelm |
| 2007/0112332 A1 | 5/2007 | Harding et al. |
| 2007/0118405 A1 | 5/2007 | Campbell et al. |
| 2007/0129690 A1 | 6/2007 | Rosenblatt et al. |
| 2007/0173974 A1 | 7/2007 | Lin |
| 2007/0197163 A1 | 8/2007 | Robertson |
| 2007/0255260 A1 | 11/2007 | Haase |
| 2007/0282269 A1 | 12/2007 | Carter et al. |
| 2008/0001737 A1 | 1/2008 | Metry |
| 2008/0004515 A1 | 1/2008 | Jennewine |
| 2008/0051738 A1 | 2/2008 | Griffin |
| 2008/0051765 A1 | 2/2008 | Mounce |
| 2008/0065000 A1 | 3/2008 | Bidinger et al. |
| 2008/0065050 A1 | 3/2008 | Sparks et al. |
| 2008/0078400 A1 | 4/2008 | Martens et al. |
| 2008/0119790 A1 | 5/2008 | Hawkins et al. |
| 2008/0132880 A1 | 6/2008 | Buchman |
| 2008/0249508 A1 | 10/2008 | Lopez et al. |
| 2008/0287906 A1 | 11/2008 | Burkholz et al. |
| 2009/0054866 A1 | 2/2009 | Teisen-Simony et al. |
| 2009/0062767 A1 | 3/2009 | Van Antwerp et al. |
| 2009/0069787 A1 | 3/2009 | Estes et al. |
| 2009/0099521 A1 | 4/2009 | Gravesen et al. |
| 2009/0124979 A1 | 5/2009 | Raymond et al. |
| 2009/0198215 A1 | 8/2009 | Chong et al. |
| 2009/0299300 A1 | 12/2009 | Truitt et al. |
| 2010/0137784 A1 | 6/2010 | Cefai et al. |
| 2010/0152658 A1 | 6/2010 | Hanson et al. |
| 2011/0054390 A1 | 3/2011 | Searle et al. |
| 2011/0054399 A1 | 3/2011 | Chong et al. |
| 2011/0108158 A1 | 5/2011 | Huwiler et al. |
| 2011/0130742 A1 | 6/2011 | Hawkins et al. |
| 2011/0144586 A1 | 6/2011 | Michaud et al. |
| 2011/0166512 A1 | 7/2011 | Both et al. |
| 2011/0230833 A1 | 9/2011 | Landman et al. |
| 2011/0231204 A1 | 9/2011 | De La Huerga |

(56) References Cited

U.S. PATENT DOCUMENTS

| | | |
|---|---|---|
| 2011/0251509 A1 | 10/2011 | Beyhan et al. |
| 2011/0316562 A1 | 12/2011 | Cefai et al. |
| 2011/0319814 A1 | 12/2011 | Sullivan et al. |
| 2012/0003093 A1 | 1/2012 | Lischer et al. |
| 2012/0003935 A1 | 1/2012 | Lydon et al. |
| 2012/0010594 A1 | 1/2012 | Holt et al. |
| 2012/0056000 A1 | 3/2012 | Shores |
| 2012/0078161 A1 | 3/2012 | Masterson et al. |
| 2012/0109066 A1 | 5/2012 | Chase et al. |
| 2012/0238851 A1 | 9/2012 | Kamen et al. |
| 2012/0277668 A1 | 11/2012 | Chawla |
| 2013/0060233 A1 | 3/2013 | OConnor et al. |
| 2013/0178791 A1 | 7/2013 | Javitt |
| 2013/0317753 A1 | 11/2013 | Kamen et al. |
| 2014/0074033 A1 | 3/2014 | Sonderegger et al. |
| 2014/0127048 A1 | 5/2014 | DiIanni et al. |
| 2014/0128839 A1 | 5/2014 | DiIanni et al. |
| 2014/0135880 A1 | 5/2014 | Baumgartner et al. |
| 2014/0316379 A1 | 10/2014 | Sonderegger et al. |
| 2015/0157537 A1 | 6/2015 | Lanigan et al. |
| 2015/0233362 A1* | 8/2015 | Jiang ............ F04B 25/04 417/254 |
| 2016/0008536 A1 | 1/2016 | Gravesen et al. |
| 2016/0015891 A1 | 1/2016 | Papiorek |
| 2016/0038689 A1 | 2/2016 | Lee et al. |
| 2016/0144105 A1 | 5/2016 | Hooven et al. |
| 2016/0296695 A1 | 10/2016 | Hassman et al. |
| 2016/0302054 A1 | 10/2016 | Kimura et al. |
| 2017/0128664 A1 | 5/2017 | Diianni et al. |
| 2017/0290975 A1 | 10/2017 | Barmaimon et al. |
| 2017/0340811 A1 | 11/2017 | Pananen |
| 2018/0008767 A1 | 1/2018 | Lambert |
| 2019/0001057 A1 | 1/2019 | Tsoukalis et al. |
| 2019/0328974 A1 | 10/2019 | Cowe et al. |
| 2023/0241296 A1* | 8/2023 | Kamrava ......... A61M 5/1452 417/1 |

FOREIGN PATENT DOCUMENTS

| | | |
|---|---|---|
| DE | 19723648 C1 | 8/1998 |
| DE | 19920896 A1 | 11/2000 |
| EP | 0341049 A2 | 11/1989 |
| EP | 342947 A2 | 11/1989 |
| EP | 0496305 A2 | 7/1992 |
| EP | 0763369 A1 | 3/1997 |
| EP | 0789146 A1 | 8/1997 |
| EP | 0867196 A2 | 9/1998 |
| EP | 0937475 A2 | 8/1999 |
| EP | 1065378 A2 | 1/2001 |
| EP | 2229970 A1 | 9/2010 |
| EP | 2397181 A1 | 12/2011 |
| EP | 2556815 A1 | 2/2013 |
| EP | 2830499 A1 | 2/2015 |
| EP | 2819724 B1 | 3/2019 |
| GB | 875034 A | 8/1961 |
| GB | 2443261 A | 4/2008 |
| JP | 2008536625 A | 9/2008 |
| JP | 2010510027 A | 4/2010 |
| TW | 200740148 A | 10/2007 |
| TW | M452390 U | 5/2013 |
| WO | 8101658 A1 | 6/1981 |
| WO | 8606796 A1 | 11/1986 |
| WO | 9800193 A1 | 1/1998 |
| WO | 9801071 A1 | 1/1998 |
| WO | 9856293 A1 | 12/1998 |
| WO | 9910040 A1 | 3/1999 |
| WO | 9956803 A1 | 11/1999 |
| WO | 9962576 A1 | 12/1999 |
| WO | 0019887 A1 | 4/2000 |
| WO | 0029047 A1 | 5/2000 |
| WO | 0029049 A1 | 5/2000 |
| WO | 0030705 A1 | 6/2000 |
| WO | 0061215 A1 | 10/2000 |
| WO | 0074752 A1 | 12/2000 |
| WO | 0078210 A1 | 12/2000 |
| WO | 0152727 A1 | 7/2001 |
| WO | 0156633 A2 | 8/2001 |
| WO | 0176684 A1 | 10/2001 |
| WO | 0220073 A2 | 3/2002 |
| WO | 0226282 A2 | 4/2002 |
| WO | 0240083 A2 | 5/2002 |
| WO | 2002068823 | 9/2002 |
| WO | 2003030984 A1 | 4/2003 |
| WO | 03090509 A2 | 11/2003 |
| WO | 200172354 A2 | 11/2003 |
| WO | 2002015954 A1 | 11/2003 |
| WO | 2006053007 A2 | 5/2006 |
| WO | 2007064835 A2 | 6/2007 |
| WO | 2008024810 A2 | 2/2008 |
| WO | 2008133702 A1 | 11/2008 |
| WO | 2009070731 A1 | 6/2009 |
| WO | 2009098648 A2 | 8/2009 |
| WO | 2011095483 A1 | 8/2011 |
| WO | 2012045667 A2 | 4/2012 |
| WO | 2012065780 A2 | 5/2012 |
| WO | 2012108959 A1 | 8/2012 |
| WO | 2012134588 A1 | 10/2012 |
| WO | 2012134589 A1 | 10/2012 |
| WO | 2013078200 A1 | 5/2013 |
| WO | 2013134486 A2 | 9/2013 |
| WO | 2013149186 A1 | 10/2013 |
| WO | 2013182321 A1 | 12/2013 |
| WO | 2014099404 A1 | 6/2014 |
| WO | 2014154777 A1 | 10/2014 |
| WO | 2014194183 A2 | 12/2014 |
| WO | 2014204894 A2 | 12/2014 |
| WO | 2015061493 A1 | 4/2015 |
| WO | 2015061690 A1 | 4/2015 |
| WO | 2015081337 A2 | 6/2015 |
| WO | 2015177652 A1 | 11/2015 |
| WO | 2016141082 A1 | 9/2016 |
| WO | 2016162755 A2 | 10/2016 |
| WO | 2017205816 A1 | 11/2017 |

OTHER PUBLICATIONS

European Search Report and Written Opinion, Application No. EP02768908, dated Apr. 30, 2010.
International Search Report and Written Opinion, Application No. PCT/US2019/042233, mailed Jan. 3, 2020, 14 pages.
International Search Report and Written Opinion, Application No. PCT/US2021/060148, mailed Mar. 17, 2022, 17 pages.
International Search Report and Written Opinion, Application No. PCT/US2022/016713, mailed Aug. 5, 2022, 19 pages.
International Search Report and Written Opinion, Application No. PCT/US2023/061426, mailed Apr. 13, 2023, 14 pages.
European Search Report and Written Opinion for the EP Application No. EP17736272, dated Oct. 7, 2019.
International Search Report and Written Opinion dated Feb. 13, 2009 issued in related International Patent Application No. PCT/US08/84971, 6 pages.
NovoLog, "NovoLog Flex Pen", available at http://www.novolog.com/devices-flexpen.asp; retrieved on Sep. 11, 2007.
International Search Report and Written Opinion dated Mar. 27, 2020 issued in International Patent Application No. PCT/US19/42408, 18 pages.
International Search Report and Written Opinion for Application No. PCT/US17/12207, mailed May 26, 2017, 10 pages.
International Search Report and Written Opinion for PCT Application No. PCT/US2018/018901, dated Aug. 6, 2018, 12 pages.
International Search Report and Written Opinion for PCT Application No. PCT/US2017/015601, mailed on May 16, 2017, 12 pages.
International Search Report and Written Opinion for PCT Application No. PCT/US18/52464, mailed on Jan. 4, 2019, 11 pages.
International Preliminary Report on Patentability mailed on Oct. 9, 2014, issued in PCT Patent Application No. PCT/US2013/034674, 14 pages.
International Search Report and Written Opinion for PCT Application No. PCT/US2022/015985, mailed May 30, 2022, 13 pages.

(56) References Cited

OTHER PUBLICATIONS

International Preliminary Report on Patentability mailed on Apr. 9, 2020, issued in PCT Patent Application No. PCT/US2018/052464, 7 pages.
Web-Site Brochure dated Jan. 4, 2000. MiniMed 508. "Doing its job. Naturally." www.minimed.com/files/mm113.htm.
Web-Site Brochure dated Jan. 4, 2000. SOOIL—Homepage. "Portable Insulin Pump".www.sooil.com/intro2.htm.
Web-Site Brochure dated Dec. 20, 1999. "The Animas R-1000 Insulin Pump". www.animascorp.com/pump_f_s.html.
Web-Site Brochure dated Jan. 4, 2000. SOOIL—Homepage. "Portable Insulin Pump". www.sooil.com/product2.htm.
Web-Site Brochure dated Jan. 4, 2000. SOOIL—Homepage. "Portable Insulin Pump".www.sooil.com/product3.htm.
Web-Site Brochure dated Jan. 4, 2000. SOOIL—Homepage. "Portable Insulin Pump". www.sooil.com/product4.htm.
EPO Search Report dated Nov. 11, 2015, received in corresponding Application No. 13768938.6, 7 pgs.
International Search Report and Written Opinion for PCT Application No. PCT/GB2015/050248, mailed Jun. 23, 2015, 11 pages.
Web-Site Brochure dated Jan. 4, 2000. "The Glucose Sensor".www.animascorp.corn/sensor_f.html.
Web-Site Brochure dated Dec. 20, 1999. Applied Medical Technology.• "508 Pump Information". www.applied-medical.co.uk/508.htm.
User's Guide for Model 508 Insulin Pump, Mini Med, Aug. 2000, 153 pages.
International Search Report for PCT Application No. PCT/US03/16640, dated Oct. 2, 2003, 1 page.

\* cited by examiner

PUMP MECHANISM WITH DOUBLE RESERVOIR AND STATIONARY FLUID PORTS

RELATED APPLICATIONS

This application claims the benefit of U.S. Provisional Patent Application No. 63/370,393, filed Aug. 4, 2022, the contents of which are incorporated herein by reference in their entirety.

BACKGROUND

Many conventional automatic drug delivery systems are well known, including, for example, wearable drug delivery devices. The drug delivery device can be designed to deliver any type of liquid drug to a user. In specific embodiments, the drug delivery device can be, for example, an OmniPod® drug delivery device manufactured by Insulet Corporation of Acton, Massachusetts. The drug delivery device can be a drug delivery device such as those described in U.S. Pat. Nos. 7,303,549, 7,137,964, or 6,740,059, each of which is incorporated herein by reference in its entirety.

Such drug delivery devices typically include a positive displacement pump mechanism. The pump mechanism may comprise a reservoir that stores the liquid drug. The liquid drug stored in the reservoir may be delivered to the user by expelling the drug from a reservoir using a driven plunger that longitudinally translates through the reservoir to force the liquid drug through a fluid port defined in the reservoir. The plunger may be longitudinally translated through the reservoir by, for example, a rigid leadscrew which pushes the plunger forward during pumping.

One embodiment of a pump mechanism for use in a drug delivery device uses a double reservoir configuration. Such a double reservoir is schematically shown in FIG. 2 and disclosed in U.S. Provisional Patent Application No. 63/304,270, filed Jan. 28, 2022. In this configuration, the pump mechanism has a larger, outer reservoir 202 and a smaller, inner reservoir 204 wherein the inner reservoir 204 has a cross-sectional shape slightly smaller than the outer reservoir 202 such that the inner reservoir 204 can linearly translate into and out of the outer reservoir 202, acting as a plunger for outer reservoir 202. The two reservoirs 202, 204 are in fluid communication with each other via a rigid hollow rod 206 which is disposed between inner reservoir 202 and outer reservoir 204 and which supports a static plunger 208 for inner reservoir 204 such that, as inner reservoir 204 is linearly translated into outer reservoir 202, inner reservoir 204 forces a fluid from outer reservoir 202, through the hollow rod 206 and into inner reservoir 204. The static plunger 208 in inner reservoir 204 acts to force fluid from inner reservoir 204 through an outlet fluid port 210 as inner reservoir 204 is linearly translated into outer reservoir 202. Inner reservoir 204 and outer reservoir 202 are filled via inlet fluid port 212.

In a double reservoir pump mechanism, one or both reservoirs need to move during the filling of the pump mechanism or the dispensing of the fluid drug. In the exemplary configuration shown in FIG. 2, outer reservoir 202 is stationary and is rigidly connected to a housing of the drug delivery device at attachment point 214 and inner reservoir 204 moves with respect to outer reservoir 202. Other configurations are possible. Because it is desirable, to allow the escape of air from both reservoirs of the pump mechanism during the filling process, it is necessary to have one port fluidly connected with one reservoir and another port fluidly connected with the other reservoir. For example, in one embodiment, the fill port may be fluidly connected to the outer reservoir while the dispensing port may be fluidly connected to the inner reservoir.

The fluid transfer becomes more challenging when one of the reservoirs is moving because movement of the reservoir imposes various risks on the fluid path connected to the moving reservoir. Leakage in the fluid path, trapped air in the fluid path, unintentional dosing, and increase of dead volume are some of the risks.

Finding a solution to avoid the identified risks would significantly improve the performance and increase the reliability of a double reservoir pumping system. Therefore, it would be desirable to provide a design for a double reservoir configuration that allows a stationary fluid port to be fluidly connected to a moving reservoir.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In a primary embodiment of the invention, a design is presented which provides a stationary fluid port in fluid communion with a moving reservoir in a double reservoir pumping mechanism. The design extends the fluid path connected to the needle or cannula from the back of outer reservoir 202 to the inner reservoir 204 through the plunger tube 206 to provide a path to remove the air from inner reservoir 204 while the dispense fluid port and the fluid path to the needle or cannula are stationary, even when inner reservoir 204 moves. The design is explained in detail below.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

This disclosure presents various systems, components and methods for moving a liquid drug from a liquid reservoir in a drug delivery device to a patient interface, such as a needle or cannula. The embodiments described herein provide one or more advantages over conventional, prior art systems, components and methods, namely, a smaller overall footprint of the drug delivery device.

Various embodiments of the present invention include systems and methods for delivering a medication to a user using a drug delivery device (sometimes referred to herein as a "pod"), either autonomously, or in accordance with a wireless signal received from an electronic device. In various embodiments, the electronic device may be a user device comprising a smartphone, a smart watch, a smart necklace, a module attached to the drug delivery device, or any other type or sort of electronic device that may be carried by the user or worn on the body of the user and that executes an algorithm that computes the times and dosages of delivery of the medication.

For example, the user device may execute an "artificial-pancreas" (AP) algorithm that computes the times and dosages of delivery of insulin. The user device may also be in communication with a sensor, such as a glucose sensor or a continuous glucose monitor (CGM), that collects data on a physical attribute or condition of the user, such as a glucose level. The sensor may be disposed in or on the body of the user and may be part of the drug delivery device or may be a separate device.

Alternatively, the drug delivery device may be in communication with the sensor in lieu of or in addition to the communication between the sensor and the user device. The communication may be direct (if, e.g., the sensor is integrated with or otherwise a part of the drug delivery device) or remote/wireless (if, e.g., the sensor is disposed in a different housing than the drug delivery device). In these embodiments, the drug delivery device contains computing hardware (e.g., a processor, memory, firmware, etc.) that executes some or all of the algorithm that computes the times and dosages of delivery of the medication.

Figure 1:
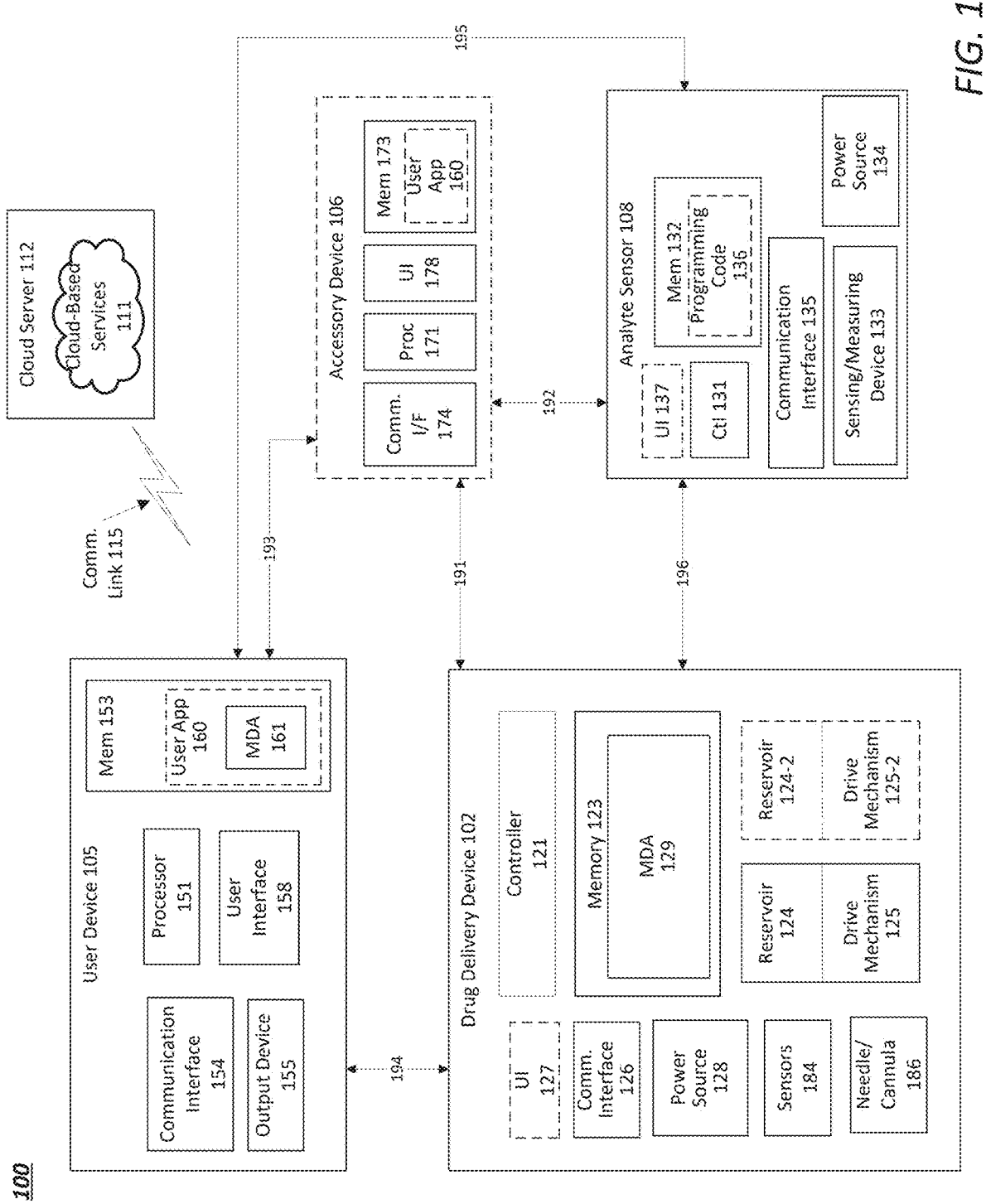
FIG. 1 illustrates a functional block diagram of an exemplary system suitable for implementing the systems and methods disclosed herein.

FIG. 1 illustrates a functional block diagram of an exemplary drug delivery system 100 suitable for implementing the systems and methods described herein. The drug delivery system 100 may implement (and/or provide functionality for) a medication delivery algorithm, such as an artificial pancreas (AP) application, to govern or control the automated delivery of a drug or medication, such as insulin, to a user (e.g., to maintain euglycemia—a normal level of glucose in the blood). The drug delivery system 100 may be an automated drug delivery system that may include a drug delivery device 102 (which may be wearable), an analyte sensor 108 (which may also be wearable), and a user device 105. Types of drugs that may be delivered by a drug delivery device include, for example, insulin, GLP-1, pramlintide, glucagon, morphine, blood pressure medicines, chemotherapy drugs, fertility drugs, arthritis drugs, or the like, or co-formulations of two or more of GLP-1, pramlintide, and insulin.

Drug delivery system 100, in an optional example, may also include an accessory device 106, such as a smartwatch, a personal assistant device, an insulin smartpen, or the like, which may communicate with the other components of system 100 via either a wired or wireless communication links 191-193.

User Device

The user device 105 may be a computing device such as a smartphone, a smartwatch, a tablet, a personal diabetes management (PDM) device, a dedicated diabetes therapy management device, or the like. In an example, user device 105 may include a processor 151, device memory 153, a user interface 158, and a communication interface 154. The user device 105 may also contain analog and/or digital circuitry that may be implemented as a processor 151 for executing processes based on programming code stored in device memory 153, such as user application 160 incorporating a medication delivery algorithm (MDA) 161 to manage, for example, a user's blood glucose levels, and/or for controlling the delivery of the drug, medication, or therapeutic agent to the user, as well for providing other functions, such as calculating carbohydrate-compensation dosage, a correction bolus dosage and the like as discussed below. The user device 105 may be used to activate, deactivate, trigger a needle/canula insertion, program, adjust settings, and/or control operation of drug delivery device 102 and/or the analyte sensor 103 as well as the optional smart accessory device 106.

The processor 151 may also be configured to execute programming code stored in device memory 153, such as the user app 160. The user app 160 may be a computer application that is operable to deliver a drug based on information received from the analyte sensor 103, the cloud-based services 111 and/or the user device 105 or optional accessory device 106. The memory 153 may also store programming code to, for example, operate the user interface 158 (e.g., a touchscreen device, a camera or the like), the communication interface 154 and the like. The processor 151, when executing user app 160, may be configured to implement indications and notifications related to meal ingestion, blood glucose measurements, and the like. The user interface 158 may be under the control of the processor 151 and be configured to present a graphical user interface that enables the input of a meal announcement, adjust setting selections and the like as described herein.

In a specific example, when the user app 160 includes MDA 161, the processor 151 is also configured to execute a diabetes treatment plan (which may be stored in a memory) that is managed by user app 160. In addition to the functions mentioned above, when user app 160 is an AP application, it may further provide functionality to determine a carbohydrate-compensation dosage, a correction bolus dosage and determine a real-time basal dosage according to a diabetes treatment plan. In addition, user app 160 provides functionality to output signals to the drug delivery device 102 via communications interface 154 to deliver the determined bolus and/or basal dosages.

The communication interface 154 may include one or more transceivers that operate according to one or more radio-frequency protocols. In one embodiment, the transceivers may comprise a cellular transceiver and a Bluetooth® transceiver. The communication interface 154 may be configured to receive and transmit signals containing information usable by user app 160.

User device 105 may be further provided with one or more output devices 155 which may be, for example, a speaker or a vibration transducer, to provide various signals to the user.

Drug Delivery Device

In various exemplary embodiments, drug delivery device 102 may include a reservoir 124 and drive mechanism 125, which are controllable by controller 121, executing a medication delivery algorithm (MDA) 129 stored in memory 123, which may perform some or all of the functions of the AP application described above, such that user device 105 may be unnecessary for drug delivery device 102 to carry out drug delivery and control. Alternatively, controller 121 may act to control reservoir 124 and drive mechanism 125 based on signals received from user app 160 executing on a user device 105 and communicated to drug delivery device 102 via communication link 194. Drive mechanism 125 may operate, for example, to longitudinally translate a plunger through the reservoir, so as to force the liquid drug through an outlet fluid port to needle/cannula 186.

In an alternate embodiment, drug delivery device 102 may also include an optional second reservoir 124-2 and second drive mechanism 125-2 which enables the independent delivery of two different liquid drugs. As an example, reservoir 124 may be filled with insulin, while reservoir 124-2 may be filled with Pramlintide, GLP-1, glucagon, or another drug. In some embodiments, each of reservoirs 124, 124-2 may be configured with a separate drive mechanism 125, 125-2, respectively, which may be separately controllable by controller 121 under the direction of MDA 129. Both reservoirs 124, 124-2 may be connected to a common needle/cannula 186.

Drug delivery device 102 may be optionally configured with a user interface 127 providing a means for receiving input from the user and a means for outputting information to the user. User interface 127 may include, for example, light-emitting diodes, buttons on a housing of drug delivery device 102, a sound transducer, a micro-display, a microphone, an accelerometer for detecting motions of the device or user gestures (e.g., tapping on a housing of the device) or any other type of interface device that is configured to allow a user to enter information and/or allow drug delivery device 102 to output information for presentation to the user (e.g., alarm signals or the like).

Drug delivery device 102 includes a patient interface 186 for interfacing with the user to deliver the liquid drug. Patient interface may be, for example, a needle, cannula, or microneedle array for delivering the drug into the body of the user (which may be done subcutaneously, intraperitoneally, or intravenously). Drug delivery device 102 further includes a mechanism for inserting the needle/cannula 186 into the body of the user, which may be integral with or attachable to drug delivery device 102. The insertion mechanism may comprise, in one embodiment, an actuator that inserts the needle/cannula 186 under the skin of the user and thereafter retracts the needle, leaving the cannula in place. The actuator may be triggered by user device 105 or may be a manual firing mechanism comprising springs or other energy storing mechanism, that causes the needle/cannula 186 to penetrate the skin of the user.

In one embodiment, drug delivery device 102 includes a communication interface 126, which may be a transceiver that operates according to one or more radio-frequency protocols, such as Bluetooth®, Wi-Fi, near-field communication, cellular, or the like. The controller 121 may, for example, communicate with user device 105 and an analyte sensor 108 via the communication interface 126.

In some embodiments, drug delivery device 102 may be provided with one or more sensors 184. The sensors 184 may include one or more of a pressure sensor, a power sensor, or the like that are communicatively coupled to the controller 121 and provide various signals. For example, a pressure sensor may be configured to provide an indication of the fluid pressure detected in a fluid pathway between the patient interface 186 and reservoir 124. The pressure sensor may be coupled to or integral with the actuator for inserting the patient interface 186 into the user. In an example, the controller 121 may be operable to determine a rate of drug infusion based on the indication of the fluid pressure. The rate of drug infusion may be compared to an infusion rate threshold, and the comparison result may be usable in determining an amount of insulin onboard (IOB) or a total daily insulin (TDI) amount. In one embodiment, analyte sensor 108 may be integral with drug delivery device 102.

Drug delivery device 102 further includes a power source 128, such as a battery, a piezoelectric device, an energy harvesting device, or the like, for supplying electrical power to controller 121, memory 123, drive mechanisms 125 and/or other components of drug delivery device 102.

Drug delivery device 102 may be configured to perform and execute processes required to deliver doses of the medication to the user without input from the user device 105 or the optional accessory device 106. As explained in more detail, MDA 129 may be operable, for example, to determine an amount of insulin to be delivered, IOB, insulin remaining, and the like and to cause controller 121 to activate drive mechanism 125 to deliver the medication from reservoir 124. MDA 129 may take as input data received from the analyte sensor 108 or from user app 160.

The reservoirs 124, 124-2 may be configured to store drugs, medications or therapeutic agents suitable for automated delivery, such as insulin, Pramlintide, GLP-1, co-formulations of insulin and GLP-1, glucagon, morphine, blood pressure medicines, chemotherapy drugs, fertility drugs, arthritis drugs, or the like.

Drug delivery device 102 may be a wearable device and may be attached to the body of a user, such as a patient or diabetic, at an attachment location and may deliver any therapeutic agent, including any drug or medicine, to a user at or around the attachment location. A surface of drug delivery device 102 may include an adhesive to facilitate attachment to the skin of a user.

When configured to communicate with an external device, such as the user device 105 or the analyte sensor 108, drug delivery device 102 may receive signals over the wired or wireless link 194 from the user device 105 or from the analyte sensor 108. The controller 121 of drug delivery device 102 may receive and process the signals from the respective external devices as well as implementing delivery of a drug to the user according to a diabetes treatment plan or other drug delivery regimen.

Accessory Device

Optional accessory device 107 may be, a wearable smart device, for example, a smart watch (e.g., an Apple Watch®), smart eyeglasses, smart jewelry, a global positioning system-enabled wearable, a wearable fitness device, smart clothing, or the like. Similar to user device 105, the accessory device 107 may also be configured to perform various functions including controlling drug delivery device 102. For example, the accessory device 107 may include a communication interface 174, a processor 171, a user interface 178 and a memory 173. The user interface 178 may be a graphical user interface presented on a touchscreen display of the smart accessory device 107. The memory 173 may store programming code to operate different functions of the smart accessory device 107 as well as an instance of the user app 160, or a pared-down version of user app 160 with reduced functionality. In some instances, accessory device 107 may also include sensors of various types.

Analyte Sensor

The analyte sensor 108 may include a controller 131, a memory 132, a sensing/measuring device 133, an optional user interface 137, a power source/energy harvesting circuitry 134, and a communication interface 135. The analyte sensor 108 may be communicatively coupled to the processor 151 of the management device 105 or controller 121 of drug delivery device 102. The memory 132 may be configured to store information and programming code 136.

The analyte sensor 108 may be configured to detect one or multiple different analytes, such as glucose, lactate, ketones, uric acid, sodium, potassium, alcohol levels or the like, and output results of the detections, such as measurement values or the like. The analyte sensor 108 may, in an exemplary embodiment, be configured as a continuous glucose monitor (CGM) to measure a blood glucose values at a predetermined time interval, such as every 5 minutes, every 1 minute, or the like. The communication interface 135 of analyte sensor 108 may have circuitry that operates as a transceiver for communicating the measured blood glucose values to the user device 105 over a wireless link 195 or with drug delivery device 102 over the wireless communication link 108. While referred to herein as an analyte sensor 108, the sensing/measuring device 133 of the analyte sensor 108 may include one or more additional sensing elements, such as a glucose measurement element, a heart rate monitor, a pressure sensor, or the like. The controller 131 may include discrete, specialized logic and/or components, an application-specific integrated circuit, a microcontroller or processor that executes software instructions, firmware, programming instructions stored in memory (such as memory 132), or any combination thereof.

Similar to the controller 121 of drug delivery device 102, the controller 131 of the analyte sensor 108 may be operable to perform many functions. For example, the controller 131 may be configured by programming code 136 to manage the collection and analysis of data detected by the sensing and measuring device 133.

Although the analyte sensor 108 is depicted in FIG. 1 as separate from drug delivery device 102, in various embodiments, the analyte sensor 108 and drug delivery device 102 may be incorporated into the same unit. That is, in various examples, the analyte sensor 108 may be a part of and integral with drug delivery device 102 and contained within the same housing as drug delivery device 102 or an attachable housing thereto. In such an example configuration, the controller 121 may be able to implement the functions required for the proper delivery of the medication alone without any external inputs from user device 105, the cloud-based services 111, another sensor (not shown), the optional accessory device 106, or the like.

Cloud-Based Services

Drug delivery system 100 may communicate with or receive services from a cloud server 122 providing cloud-based services 111. Services provided by cloud server 112 may include data storage that stores personal or anonymized data, such as blood glucose measurement values, historical IOB or TDI, prior carbohydrate-compensation dosage, and other forms of data. In addition, the cloud-based services 111 may process anonymized data from multiple users to provide generalized information related to TDI, insulin sensitivity, IOB and the like. The communication link 115 that couples the cloud server 112 to other components of system 100, for example, devices 102, 105, 106, 108 of system 100 may be a cellular link, a Wi-Fi link, a Bluetooth® link, or a combination thereof.

Communication Links

The wireless communication links 115 and 191-196 may be any type of wireless link operating using known wireless communication standards or proprietary standards. As an example, the wireless communication links 191-196 may provide communication links based on Bluetooth®, Zigbee®, Wi-Fi, a near-field communication standard, a cellular standard, or any other wireless protocol via the respective communication interfaces 126, 135, 154 and 174.

Operational Example

In an operational example, user application 160 implements a graphical user interface that is the primary interface with the user and is used to start and stop drug delivery device 102, program basal and bolus calculator settings for manual mode as well as program settings specific for automated mode (hybrid closed-loop or closed-loop).

User app 160, provides a graphical user interface 158 that allows for the use of large text, graphics, and on-screen instructions to prompt the user through the set-up processes and the use of system 100. It will also be used to program the user's custom basal insulin delivery profile, check the status, of drug delivery device 102, initiate bolus doses of insulin, make changes to a patient's insulin delivery profile, handle system alerts and alarms, and allow the user to switch between automated mode and manual mode.

User app 160 may be configured to operate in a manual mode in which user app 160 will deliver insulin at programmed basal rates and user-defined bolus amounts with the option to set temporary basal profiles. The controller 121 will also have the ability to function as a sensor-augmented pump in manual mode, using sensor glucose data provided by the analyte sensor 108 to populate the bolus calculator.

User app 160 may be configured to operate in an automated mode in which user app 160 supports the use of multiple target blood glucose values. For example, in one embodiment, target blood glucose values can range from 110-150 mg/dL, in 10 mg/dL increments, in 5 mg/dL increments, or other increments, but preferably 10 mg/dL increments. The experience for the user will reflect current setup flows whereby the healthcare provider assists the user to program basal rates, glucose targets and bolus calculator settings. These in turn will inform the user app 160 for insulin dosing parameters. The insulin dosing parameters will be adapted over time based on the total daily insulin (TDI) delivered during each use of drug delivery device 102. A temporary hypoglycemia protection mode may be implemented by the user for various time durations in automated mode. With hypoglycemia protection mode, the algorithm reduces insulin delivery and is intended for use over temporary durations when insulin sensitivity is expected to be higher, such as during exercise.

The user app 160 (or MDA 129) may provide periodic insulin micro-boluses based upon past glucose measurements and/or a predicted glucose over a prediction horizon (e.g., 60 minutes). Optimal post-prandial control may require the user to give meal boluses in the same manner as current pump therapy, but normal operation of the user app 160 will compensate for missed meal boluses and mitigate prolonged hyperglycemia. The user app 160 uses a control-to-target strategy that attempts to achieve and maintain a set target glucose value, thereby reducing the duration of prolonged hyperglycemia and hypoglycemia.

In some embodiments, user device 105 and the analyte sensor 108 may not communicate directly with one another. Instead, data (e.g., blood glucose readings) from analyte sensor may be communicated to drug delivery device 102 via link 196 and then relayed to user device 105 via link 194. In some embodiments, to enable communication between analyte sensor 108 and user device 105, the serial number of the analyte sensor must be entered into user app 160.

User app 160 may provide the ability to calculate a suggested bolus dose through the use of a bolus calculator. The bolus calculator is provided as a convenience to the user to aid in determining the suggested bolus dose based on ingested carbohydrates, most-recent blood glucose readings (or a blood glucose reading if using fingerstick), programmable correction factor, insulin to carbohydrate ratio, target glucose value and insulin on board (IOB). IOB is estimated by user app 160 taking into account any manual bolus and insulin delivered by the algorithm.

DESCRIPTION OF EMBODIMENTS

Figure 3:
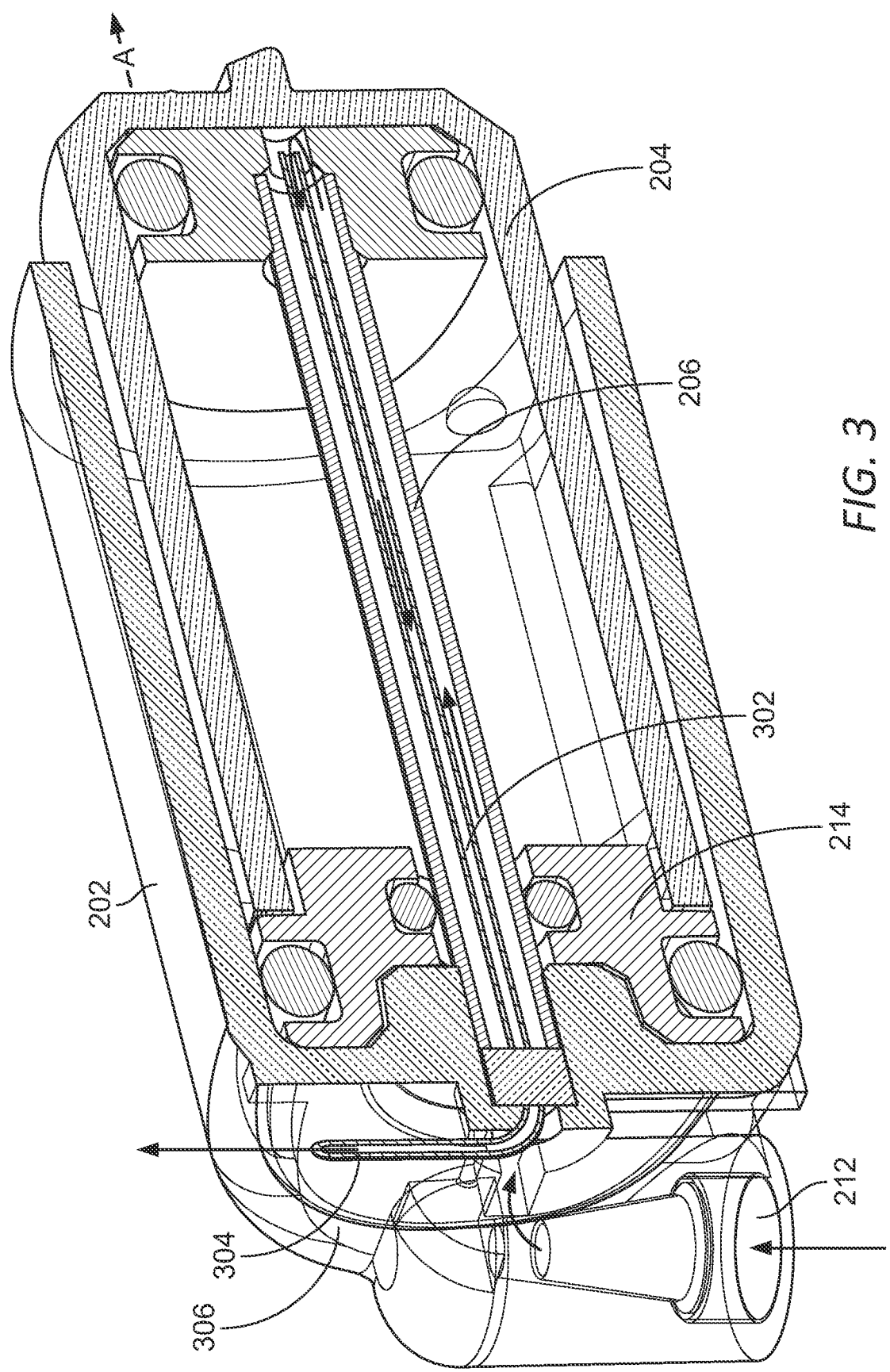
FIG. 3 is a cross-sectional, perspective view of a primary embodiment of the novel pump mechanism disclosed herein.

FIG. 3 shows an exemplary embodiment of the present invention which eliminates having either the input port or the output port on a moving reservoir in a double reservoir pump mechanism. In the embodiment shown in FIG. 3, outer reservoir 202 is the stationary reservoir, while inner reservoir 204 is the moving reservoir which moves via a linear translation back and forth within outer reservoir 202.

Figure 2:
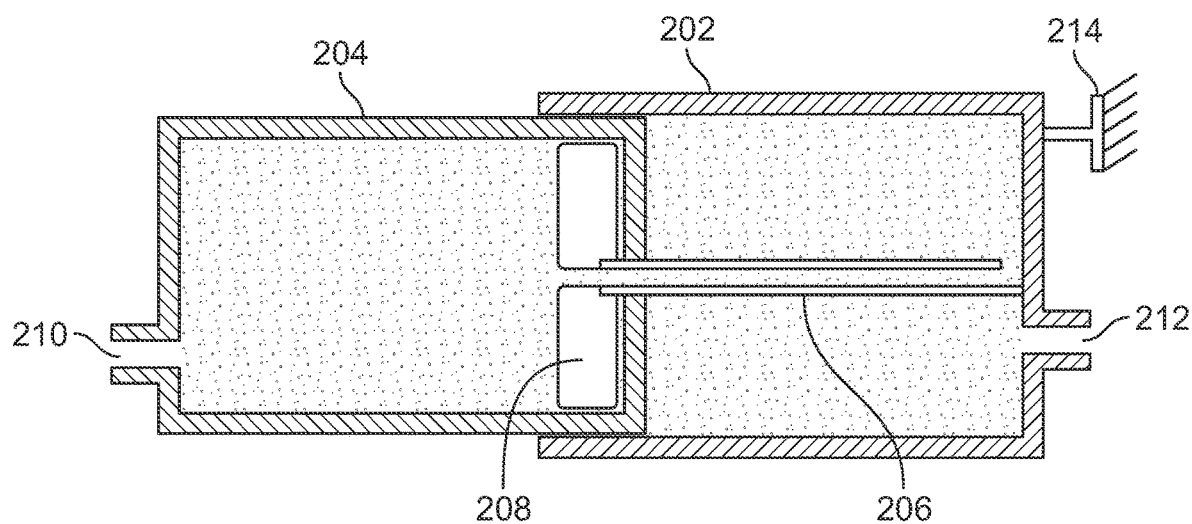
FIG. 2 is a schematic view of one embodiment of a double reservoir pump mechanism.

During the filling process, it is necessary to ensure that all (or nearly all) trapped air within both the outer reservoir 202 and the inner reservoir 204 is able to be removed from the pump mechanism. To properly remove the air from the pump mechanism during the fill process, it is necessary to have the fill port and dispense port on different reservoirs, one of which is necessarily moving. As shown in FIG. 2, the fluid enters the pump mechanism from fill port 212 and pushes air trapped in the outer reservoir 202 into the inner reservoir 204 through the plunger tube 206. Any air which is trapped in inner reservoir 204 escapes the system through dispense port 210. However, as previously discussed, it is preferable to not have either the fill port or the dispense port on the reservoir which is moving.

The embodiment in FIG. 3 solves this problem by adding an additional fluid path 302 disposed within plunger tube 206, in fluid communication with dispense port 304 such that dispense port 304 is relocated to the stationary reservoir 202 (the outer reservoir in this example). The black arrows in FIG. 3 show the fluid flow (or, initially, the air flow) from fill port 212 to dispense port 304 during the fill process. Without the additional fluid path 302 connecting dispense port 304 to inner reservoir 204, air will remain trapped within inner reservoir 204 after the fill process is completed, reducing the amount of fluid (e.g., a liquid drug) that can be held within the pump mechanism.

During the fill process, fluid enters fill port 212 and proceeds through plunger tube 206 where it begins to fill both the inner reservoir 204 and the outer reservoir 202 as the reservoirs move apart. That is, as inner reservoir 202 is forced to slide in direction "A" by the hydraulic action of fluid entering outer reservoir 202. Any air remaining in outer reservoir 202 will proceed through pushrod 206 into inner reservoir 204, while any air remaining in inner reservoir 204 will be forced through fluid path 302 and will exit the system via dispense port 304. Additional fluid path 302 and dispense port 304 fills with fluid first. A hydrophobic vent may be positioned at the distal end of outlet port 304, and when this vent wets with the fluid, the dispense port 304 becomes plugged by virtue of the fact that the hydrophobic vent will not let fluid past once wetted. At this point, the air has been forced out of additional fluid path 206 and dispense port 304. As fluid continues to be pushed into fill port 212, pressure builds up, which causes inner reservoir 204, with plunger 214 disposed on an end thereof, to move in direction "A".

Both inner reservoir 202 and outer reservoir 304 fill with the fluid at the same time. Once both reservoirs are filled, very little air remains in the pump mechanism.

Figure 4:
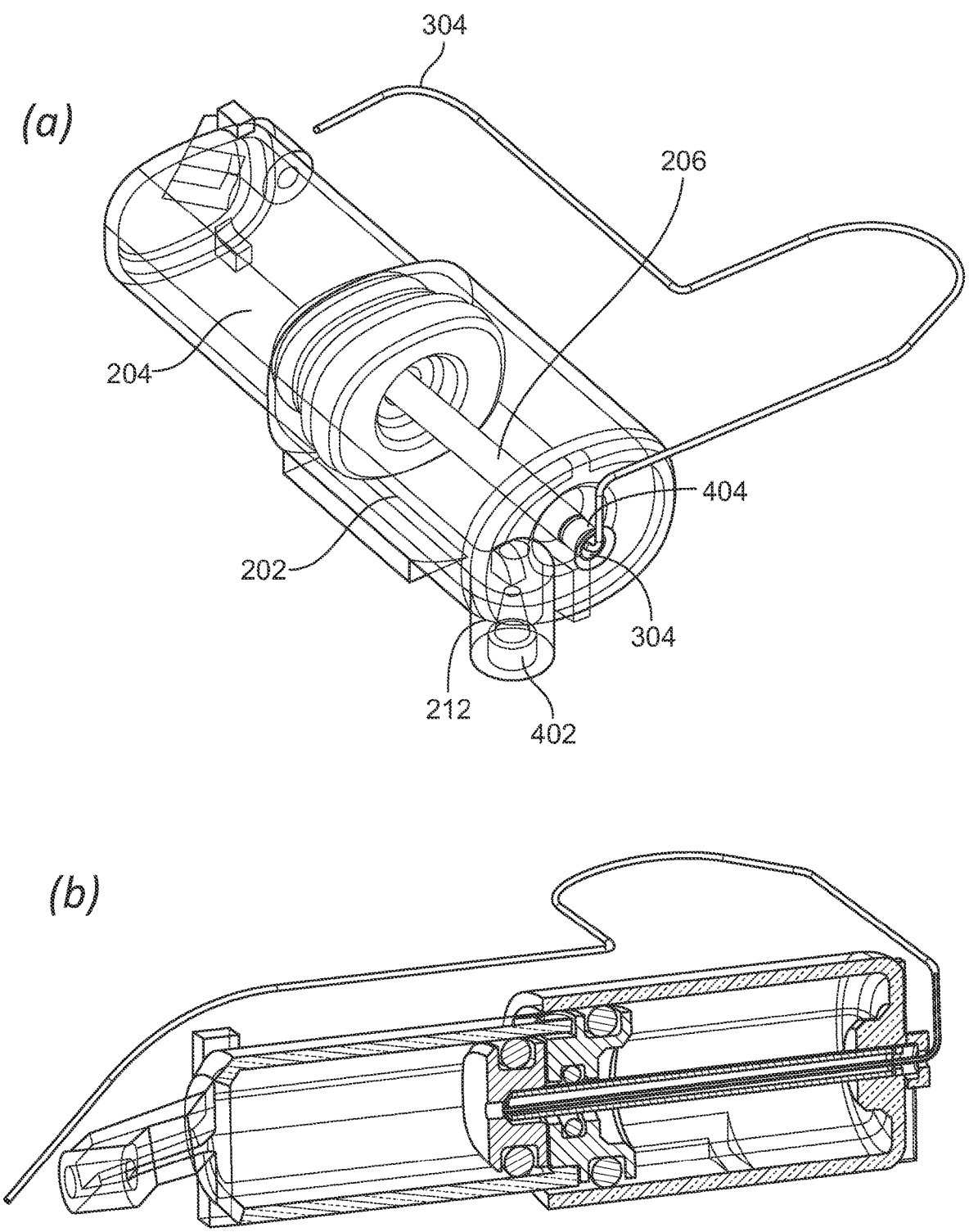
FIG. 4(a) is a perspective view of the embodiment of FIG. 3 showing the pump mechanism in a full configuration.
FIG. 4(b) is a cross-sectional view of the pump mechanism in a full configuration.
Figure 5:
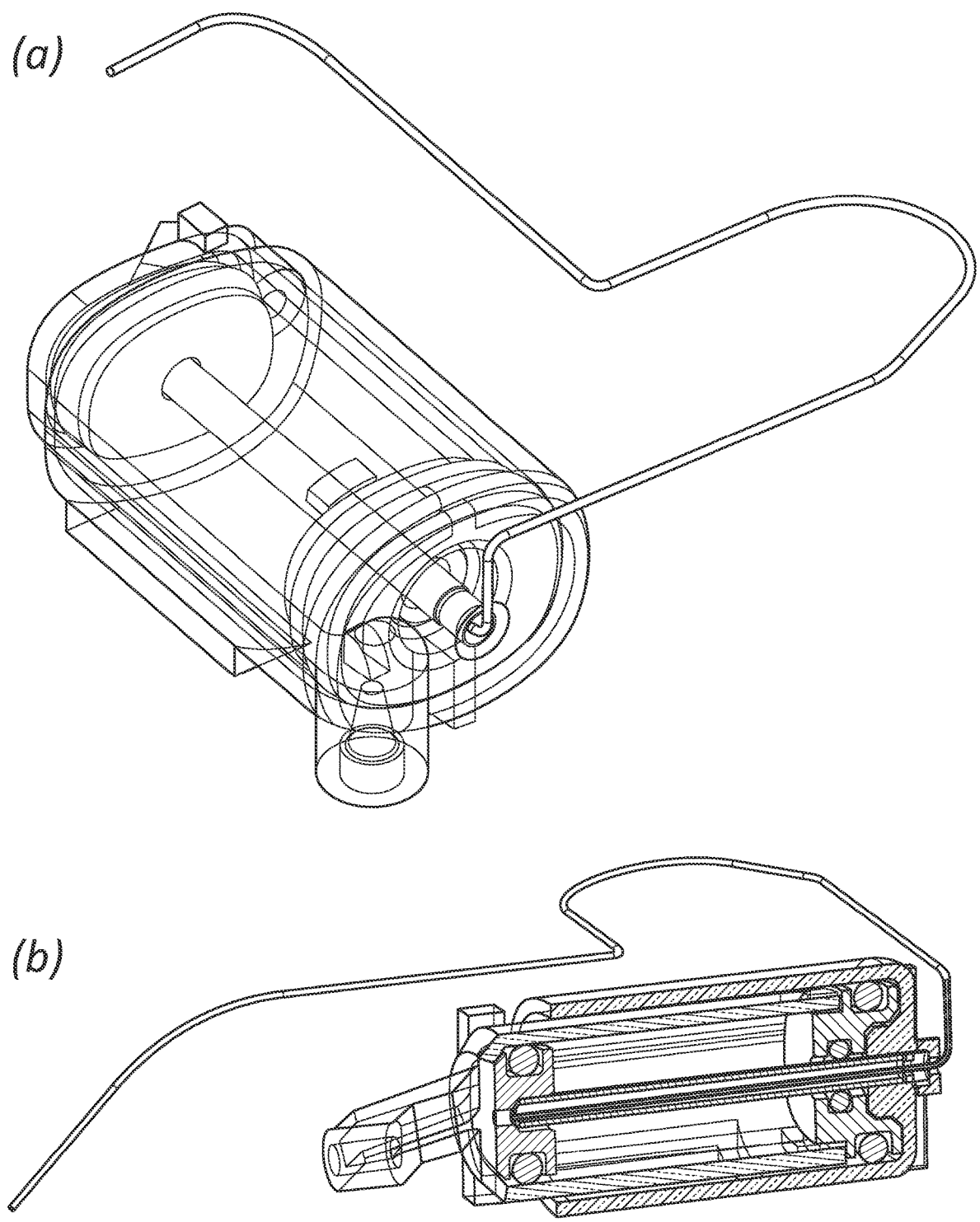
FIG. 5(a) is a perspective view of the embodiment of FIG. 3 showing the pump mechanism in an empty configuration.
FIG. 5(b) is a cross-sectional view of the pump mechanism in empty configuration.

FIG. 4(a) shows an exemplary embodiment of the double reservoir pump mechanism in the filled configuration, and FIG. 4(b) shows a cross-sectional view of the pump mechanism in the filled configuration. FIG. 5(a) shows the pump mechanism in the empty configuration and FIG. 5(b) shows a cross-sectional view of the pump mechanism in the empty configuration. As shown, both fill port 212 and dispense port 304 are located on outer reservoir 202 and are sealed with pierceable septa 402 and 404 respectively. The cross-sectional views show how extending the outlet port 304 using additional fluid path 302 from the back of the outer reservoir 202 through plunger tube 206 to inner reservoir 204 make it possible to have both fill port 212 and dispense port 304 stationary with respect to outer reservoir 202, even when inner reservoir 202 moves. One end of additional fluid path 302 is located at the end of plunger tube 206 to allow fluid to pass through the outer reservoir 202 and plunger tube 206 before leaving the reservoirs, which facilitates air removal from the double reservoir pump mechanism. The other end of dispense port 304 is fixed to an insertion mechanism (not shown) and provides a fluid path from the drug delivery device to the patient's body.

Figure 6:
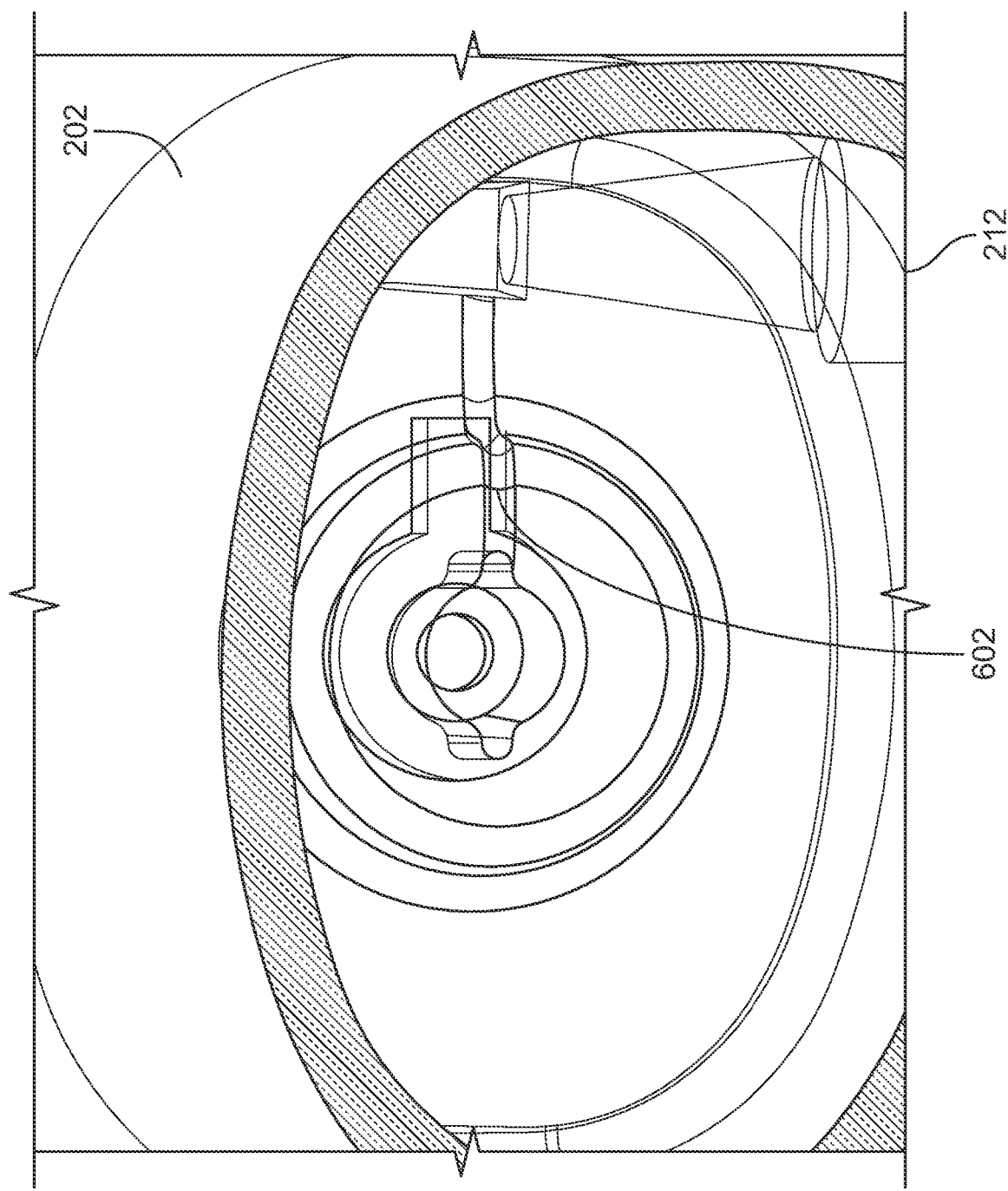
FIG. 6 is a transparent view of a portion of the outer reservoir of the embodiment of FIG. 3, showing the connection between the inlet port and the interior of the outer reservoir.

FIG. 6 is a transparent view of a portion of outer reservoir 202, showing the fluid path 602 from fill port 212 to the interior of outer reservoir 202, according to an exemplary embodiment.

As would be realized by one of ordinary skill in the art, an exemplary embodiment has been presented herein which uses a specific double reservoir configuration wherein outer reservoir 202 is fixed with respect to the housing of the drug delivery device 100 and inner reservoir 204 moves out of outer reservoir 202 during the fill process and moves into outer reservoir 202 during dispensing of the fluid. The fill port 212 and dispense port 304 extend through an end wall 306 of outer reservoir 202 such that they remain static during movement of the inner reservoir. In other embodiments, fill and dispense ports 212,304 are interchangeable, and the concept can be used for both fluid ports. Thus, the scope of the invention is meant to include embodiments wherein the inner reservoir is rigidly fixed with respect to the housing of the drug delivery device 100 and wherein movement of the outer reservoir nests the inner reservoir within the outer reservoir. In this case, the fill port 212 is in fluid communication with the inner reservoir 204 while the dispense port 304 is in fluid communication with outer reservoir 202 via additional fluid path 302 extending through hollow tube 206. In this embodiment, the fill port 212 and dispense port 304 extend through an end wall of inner reservoir 204 such that they remain static during movement of the outer reservoir. Other embodiments of the pump mechanism with a moving reservoir not specifically discussed herein are also contemplated to be within the scope of the invention. The invention is not meant to be limited by the exemplary double reservoir pump mechanism used to explain the invention herein.

The following examples pertain to various embodiments of the systems and methods disclosed herein for implementation of an automatic drug delivery system having a double reservoir pumping mechanism.

Example 1 is a first embodiment of a pump mechanism comprising an outer reservoir, and inner reservoir configured to linearly translate into and out of the outer reservoir, static plunger disposed interior to the inner reservoir, a hollow tube, supporting the static plunger and extending between the inner reservoir and the outer reservoir, thereby fluidly coupling the inner reservoir into the outer reservoir, a first fluid port in fluid communication with the other reservoir in a second fluid port in fluid communication with the inner reservoir, wherein one of the first or second fluid port extends through the hollow tube.

Example 2 is an extension of Example 1, or any other example disclosed herein, wherein the outer reservoir is rigidly attached to a structure external to the pumping mechanism.

Example 3 is an extension of Example 2, or any other example disclosed herein, wherein the second fluid port extends through the hollow tube, the second fluid port extends from an end wall of the outer reservoir and the first and second fluid port remain static as the inner reservoir moves into and out of the outer reservoir.

Example 4 is an extension of Example 1, or any other example disclosed herein, wherein the inner reservoir is rigidly attached to a structure external to the pumping mechanism.

Example 5 is an extension of Example 4, or any other example disclosed herein, wherein the first fluid port extends through the hollow tube, the first fluid port extends from an end wall of the inner reservoir and the first and second fluid port remain static as the other reservoir moves with respect to the inner reservoir.

Example 6 is an extension of Example 1, or any other example disclosed herein, wherein the inner reservoir and the outer reservoir move apart when the pumping mechanism is being filled with the fluid.

Example 7 is an extension of Example 1, or any other example disclosed herein, further comprising a drive mechanism for moving the inner reservoir and the outer reservoir toward each other as a fluid within the pumping mechanism is dispensed.

Example 8 is an extension of Example 1, or any other example disclosed herein, further comprising a fluid seal between an interior surface of the outer reservoir and an exterior surface of the inner reservoir.

Example 9 is an extension of Example 1 or any other example disclosed herein, further comprising a fluid seal disposed on a circumferential surface of the static plunger such as to create a fluid seal between the plunger and an interior surface of the into inner reservoir.

Example 10 is an extension of Example 1, or any other example disclosed herein, further comprising a fluid seal between the hollow tube and an end wall of the inner reservoir.

Example 11 is an extension of Example 10, or any other example disclosed herein, wherein the inner reservoir and the outer reservoir have a cross-sectional shape selected from a group consisting of elliptical, flattened circular and rectangular with rounded corners.

Example 12 is an extension of Example 10, or any other example disclosed herein, wherein the hollow tube extends through an end wall of the inner reservoir such as to enable the fluid communication between the inner reservoir and the outer reservoir.

Example 13 is a second embodiment of a pumping mechanism comprising an outer reservoir rigidly attached to a structure external to the pumping mechanism, and inner reservoir configured to linearly translate into and out of the outer reservoir, a static plunger disposed interior to the inner reservoir, a hollow tube supporting the static plunger and extending between the inner reservoir and the outer reservoir thereby fluidly coupling the inner reservoir to the other reservoir, a first fluid port in communication with the outer reservoir and the second fluid port in communication with the inner reservoir and extending through the hollow tube, wherein the second fluid port extends through an end wall of the outer reservoirs such that the first and second fluid port remain static as the inner reservoir moves into and out of the outer reservoir.

Example 14 is a third embodiment of a pumping mechanism comprising an inner reservoir rigidly attached to a structure external to the pumping mechanism, and outer reservoir configured to linearly translate such that the inner reservoir is nested within the outer reservoir, a static plunger disposed interior to the inner reservoir, a hollow tube supporting the static plunger and extending between the inner reservoir and the outer reservoir thereby fluidly coupling the inner reservoir to the outer reservoir, a first fluid port in fluid communication with the inner reservoir and a second fluid port in fluid communication with the outer reservoir and extending through the hollow tube, wherein the first fluid port extends through an end wall of the outer reservoir such that the first and second fluid port remain static as the outer reservoir moves toward the inner reservoir Software related implementations of the techniques described herein may include, but are not limited to, firmware, application specific software, or any other type of computer readable instructions that may be executed by one or more processors. The computer readable instructions may be provided via non-transitory computer-readable media. Hardware related implementations of the techniques described herein may include, but are not limited to, integrated circuits (ICs), application specific ICs (ASICs), field programmable arrays (FPGAs), and/or programmable logic devices (PLDs). In some examples, the techniques described herein, and/or any system or constituent component described herein may be implemented with a processor executing computer readable instructions stored on one or more memory components.

To those skilled in the art to which the invention relates, many modifications and adaptations of the invention may be realized. Implementations provided herein, including sizes, shapes, ratings compositions and specifications of various components or arrangements of components, and descriptions of specific manufacturing processes, should be considered exemplary only and are not meant to limit the invention in any way. As one of skill in the art would realize, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:
1. A drug delivery system, comprising:
  a pumping mechanism, comprising:
    a needle or cannula;
    an outer reservoir for storing a liquid drug;
    an inner reservoir for storing the liquid drug, configured to be positionable and linearly translatable within the outer reservoir;
    a static plunger;
    a hollow plunger tube, supporting the static plunger and including an internal fluidic path extending between the inner reservoir and the outer reservoir;

a dispense port for dispensing the liquid drug that is received from the reservoirs via the hollow plunger tube, the dispense port having a structure positioned in the hollow plunger tube that extends between the needle or cannula to the inner reservoir to provide a path to remove air from the inner reservoir;

a fill port for receiving the liquid drug to be stored in the reservoirs liquid drug being transported from the fill port to the inner reservoir via the hollow plunger tube.

2. The drug delivery system of claim 1 wherein:

the dispense and fill ports remain static as the inner reservoir linearly translates into and out of the outer reservoir.

3. The drug delivery system of claim 1 wherein the inner reservoir and the outer reservoir move apart as the pumping mechanism is being filled with the liquid drug.

4. The drug delivery system of claim 1 further comprising:

a fluid seal between an interior surface of the outer reservoir and an exterior surface of the inner reservoir.

5. The drug delivery system of claim 1, further comprising:

a fluid seal disposed on a circumferential surface of the static plunger such to seal between the static plunger and an interior surface of the inner reservoir.

6. The drug delivery system of claim 4 further comprising:

a fluid seal between the hollow plunger tube and an end wall of the inner reservoir.

7. The drug delivery system of claim 1 wherein the inner reservoir and the outer reservoir have a cross-sectional shape selected from a group consisting of an elliptical cross-sectional shape, a flattened circular cross-sectional shape, and a rectangular cross-sectional shape with rounded corners.

8. The drug delivery system of claim 1 wherein the hollow plunger tube extends through an end wall of the inner reservoir such as to enable the liquid drug to pass between the inner reservoir and the outer reservoir.

9. A drug delivery device, comprising:

a pumping mechanism, comprising:

a needle or cannula an outer reservoir, for storing a drug, rigidly attached to a structure external to the pumping mechanism;

an inner reservoir for storing the drug, configured to linearly translate into and out of the outer reservoir;

a static plunger disposed interior to the inner reservoir;

a hollow plunger tube, supporting the static plunger and including an internal fluidic path extending between the inner reservoir and the outer reservoir;

a dispense port for dispensing the drug received from the reservoirs via the hollow plunger tube, the dispense port having a structure positioned in the hollow plunger tube that extends between the needle or cannula to the inner reservoir to provide a path to remove air from the inner reservoir; and a fill port for receiving the drug, the drug being transported from the fill port to the inner reservoir via the hollow plunger tube.

* * * * *